United States Patent [19]

Smith et al.

[11] Patent Number: 4,799,231
[45] Date of Patent: Jan. 17, 1989

[54] LASER GAS ORIFICE INJECTION SYSTEM

[75] Inventors: Donald E. Smith, San Jose, Calif.; Michael W. Sasnett, Los Altos, Calif.

[73] Assignee: Coherent General, Palo Alto, Calif.

[21] Appl. No.: 101,130

[22] Filed: Sep. 24, 1987

[51] Int. Cl.⁴ .............................................. H01S 3/22
[52] U.S. Cl. ...................................... 372/58; 372/65; 372/87
[58] Field of Search ...................... 372/58, 65, 61, 29, 372/87, 93, 92

[56] References Cited

U.S. PATENT DOCUMENTS

| | | | |
|---|---|---|---|
| 4,470,144 | 9/1984 | Sano et al. | 372/61 |
| 4,481,632 | 11/1984 | Herbrich et al. | 372/58 |
| 4,502,145 | 2/1985 | Allen et al. | 372/37 |
| 4,622,675 | 11/1986 | Penn | 372/58 |
| 4,635,272 | 1/1987 | Kamide et al. | 372/87 |
| 4,646,310 | 2/1987 | Koseki | 372/65 |
| 4,660,209 | 4/1987 | Osada et al. | 372/65 |
| 4,661,958 | 4/1987 | Bowes et al. | 372/65 |
| 4,672,621 | 6/1987 | Morita et al. | 372/58 |
| 4,701,925 | 10/1987 | Fuke et al. | 372/38 |

FOREIGN PATENT DOCUMENTS 2158635A 11/1985 United Kingdom .

Primary Examiner—Leon Scott, Jr.
Attorney, Agent, or Firm—Limbach, Limbach & Sutton

[57] ABSTRACT

A laser resonator system including an optical resonator whose side wall has an orifice through which gas may enter the resonator's interior, and may subsequently flow along the resonator's longitudinal axis. An elongated electrode (which preferably is an anode) is positioned at the orifice in electrical communication with the entering gas so that the projection of the electrode's tip on the plane of the orifice does not coincide with the center of the orifice. In a preferred embodiment, the electrode's longitudinal axis is aligned generally perpendicular to the plane of the orifice. In another preferred embodiment, two such electrode-orifice pairs are provided and are separated by a small distance along the resonator's axis. The orifice positions are preferably on opposite sides of the resonator, so that they are separated by an azimuthal angle substantially equal to 180° with respect to the resonator tube's longitudinal axis. The relative position and orientation of each electrode-orifice pair results in an improved, flatter gas velocity profile downstream from the orifice.

19 Claims, 2 Drawing Sheets

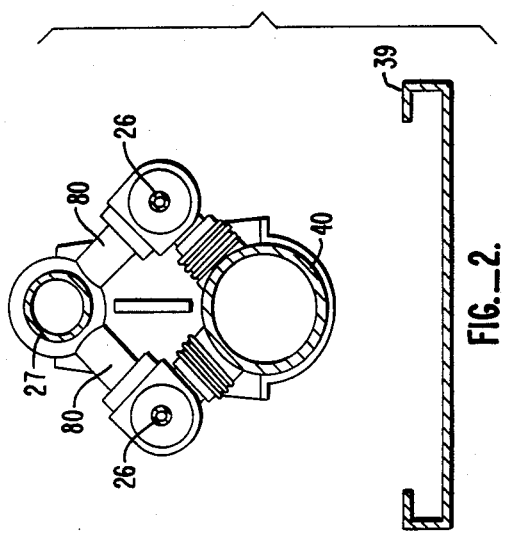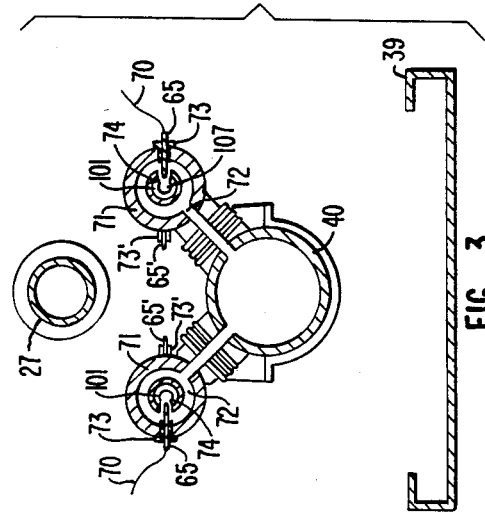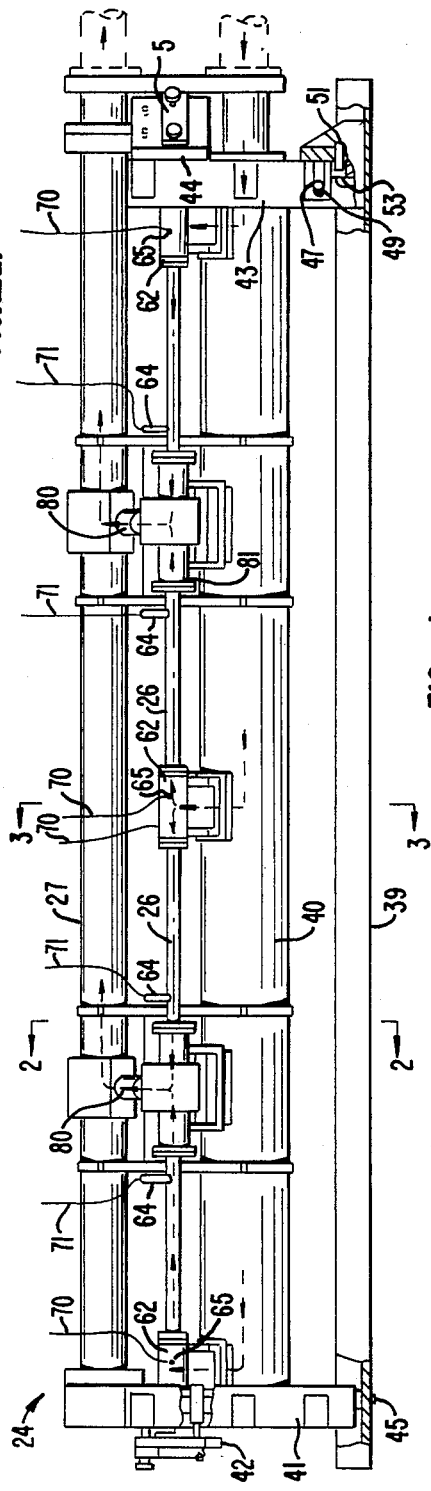

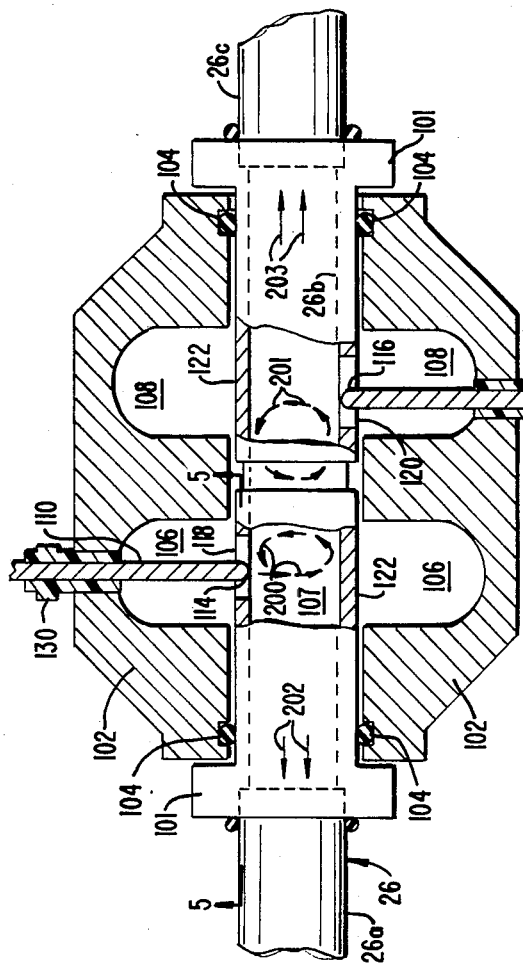
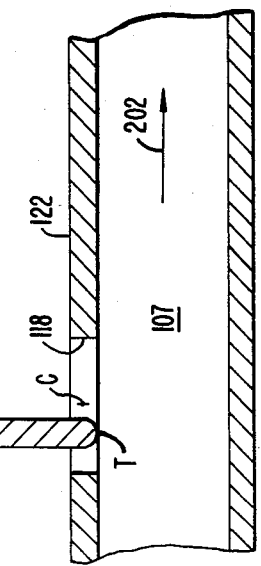
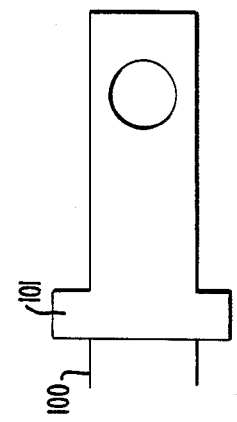

LASER GAS ORIFICE INJECTION SYSTEM

FIELD OF THE INVENTION

The present invention relates to an improved gas laser, and/or components thereof. More particularly, the present invention relates to an improved structure for introducing gas into the optical resonator of a gas laser.

BACKGROUND OF THE INVENTION

A laser has many components. Because a laser is a precision instrument, many of these components must be of high precision. One such component is the optical resonator structure. The optical resonator structure has a cavity in which the active lasing medium is excited to produce the beam of coherent radiation. At one end of the optical resonator cavity is a first highly polished mirror, which is nearly one hundred percent (100%) reflective; a second highly polished mirror is at the other end, which is less reflective than the first mirror and permits some of the radiation to be transmitted as useful output therethrough. In conventional gas lasers of the axial flow type, a gaseous lasing medium flows in the optical resonator generally parallel to the optical resonator's longitudinal axis. One or more anode-cathode pairs each introduce an electric field in the flowing gas to create a volume of plasma, sometimes referred to as the "discharge region" or "discharge volume," in the optical resonator. The contents of the optical resonator are heated by the electric field. Accordingly the purpose for circulating gas within the resonator is to remove heated gas and substitute cooler gas therefor. The removed gas (which may be a pure gas or a mixture of gasses) is typically cooled in a heat exchanger and recycled for use in the resonator.

In axial gas flow lasers, it is desirable to maintain uniform gas flow, so that the discharging volume does not irregularly move within the resonator, and so that the discharge region is not limited to an undesirably small portion of the resonator cavity (such as, for example, within a small distance from the longitudinal axis of the resonator tube). If the discharge volume moves irregularly, the laser's coherent radiation output will vary accordingly. If the discharge volume is too small, the maximum output of the laser is accordingly limited.

Conventional means for achieving uniform gas flow in an axial flow gas laser have included bulky gas inlet means having complicated design. It has not been known until the present invention how to achieve stable, uniform gas flow in an axial gas flow laser by a simple structure in which a single orifice serves a dual function as the inlet through which gas may enter the resonator, and at which a rod-type electrode may be positioned in electrical communication with the entering gas.

SUMMARY OF THE INVENTION

The inventive laser resonator system includes an optical resonator whose side wall has an orifice through which gas may enter the resonator's interior, and may subsequently flow along the resonator's longitudinal axis. An elongated electrode (which preferably is an anode, but may optionally be a cathode) is positioned at the orifice in electrical communication with the entering gas so that the projection of the electrode's tip on the plane of the orifice does not coincide with the orifice's center.

In a preferred embodiment, the electrode's longitudinal axis is aligned generally perpendicular to the plane of the orifice. In another preferred embodiment, two such electrode-orifice pairs are separated by a small distance along the resonator's axis, and the two orifices are positioned on opposite sides of the resonator, so that the orifices are separated by an azimuthal angle substantially equal to 180° with respect to the resonator's axis.

BRIEF DESCRIPTION OF THE DRAWINGS

FIG. 1 is a side view of a resonator structure of a gas laser that embodies the present invention.

FIG. 2 is a cross-sectional view of the FIG. 1 laser, taken along the line 2—2 of FIG. 1.

FIG. 3 is a cross-sectional view of the FIG. 1 laser, taken along the line 3—3 of FIG. 1.

FIG. 4 is a cross-sectional view (in a horizontal plane intersecting the axis of the gas discharge tube of FIG. 1) of a preferred type of gas injection element that may be used in the FIG. 1 system.

FIG. 5 is a cross-sectional view of the left half of the FIG. 4 apparatus, taken along line 5—5 of FIG. 4.

FIG. 6 is a cross-sectional view of a portion of the inventive system showing a preferred orientation of an electrode of the system relative to a gas inlet orifice of the system.

DETAILED DESCRIPTION OF THE PREFERRED EMBODIMENTS

FIG. 1 is a side view of laser resonator structure 24. Although for specificity, the discussion set forth hereinafter will sometimes identify structure 24 as a portion of an axial flow $CO_2$ type of laser, it should be apparent that the invention is not so limited. It is contemplated that the invention can be used in any type of laser having an axially flowing gaseous lasing medium.

Within optical resonator structure 24, gas is passed from within support tube 40 into discharge tube 26. (The discharge tube will sometimes be referred to herein as the "laser resonator tube" or the "optical resonator tube" or simply as the "resonator tube".) Within gas discharge tube 26 the lasing action of the gas is produced, generating a beam of coherent radiation. After flowing axially within discharge tube 26, the gas flows from resonator tube 26 through branch pipes 80 to exhaust tube 27.

The gas flow is indicated generally by the arrows in FIG. 1. Support tube 40 aligns and supports the optical resonator structure 24 with a first mirror 42 positioned on a first end bracket 41 at one end of the support tube 40 and a second mirror 44 positioned on a second end bracket 43 at the other end of the support tube 40. The support tube 40 is attached to each end bracket 41 and 43, and is positioned substantially parallel to the discharge tube 26. Gas from the support tube 40 is passed to the discharge tube 26 substantially near the ends of the support tube 40 and of the discharge tube 26 in a radial direction from the support tube 40 to the discharge tube 26. Once the gas is introduced into the discharge tube 26, it flows axially away from the ends of the discharge tube 26. Away from the ends of the discharge tube 26, the gas from the discharge tube 26 is passed through branch pipes 80 to the exhaust tube 27.

As shown in FIG. 2, there are two discharge tubes 26 in communication with the support tube 40 and the exhaust tube 27. Any number of discharge tubes 26 can be placed parallel to the support tube 40 and in communication therewith. However, preferably, the discharge tubes 26 are positioned axially spaced from one another by approximately 90 degrees. Also preferably for structural support, the support tube 40 should be positioned substantially near the center of the optical resonator structure 24 to achieve the greatest stability and alignment.

In order to achieve the greatest stability and support for the optical resonator structure 24, gas within the support tube 40 is maintained at a substantially constant temperature. Furthermore, preferably, the temperature of the gas within the support tube 40 is maintained above the ambient temperature.

With the gas in the support tube 40 maintained at a constant temperature, the stability of the optical resonator structure 24 and the alignment of the first and second mirrors 42 and 44 and the folding mirrors 5 (only one is shown) are less likely to be affected by temperature variations in the ambient or in the structure 24 caused by the excitation of the gas in the discharge tube 26.

A plurality of anodes 65 and cathodes 64 are mounted along discharge tube 26 in electrical communication with the gas flowing therein. The anodes are mounted in gas inlet structures 62 to be described in greater detail below. The anodes 65 and cathodes 64 are preferably spaced approximately 11.25 inches apart. The sections of discharge tube 26 between each structure 62 and each outlet structure 81 are preferably 14 inches in length, and there are either four, eight, or sixteen such sections per laser. Electrical lines 70 connect the anodes to the positive ground terminal of a DC power source (not shown) and electrical lines 71 connect the cathodes to the negative high voltage terminal of a DC power source (not shown).

The outer diameter of the discharge tube is preferably 20 mm. with an inner diameter of 18 mm. The anodes 65 are preferably positioned substantially near the ends of the discharge tube 26 and near the gas inlets from the support tube 40. The cathodes 64 are preferably positioned away from the ends of the discharge tube 26 near the gas exhaust from the discharge tube 26 to the exhaust tube 27. In the event more than one discharge tube 26 is used, the folding mirrors 5 or deflecting mirrors are used to provide increased output power.

To provide overall physical stability, the optical resonator structure 24 is made out of rigid cast aluminum. As a result, the structure 24 is of light weight. The end brackets 41 and 43 are kinematically mounted on support member 39. The support member 39 is generally parallel with the support tube 40 and with the discharge tubes 26 and the exhaust tube 27. The first end bracket 41 is rigidly fastened onto the support member 39. A mounting bolt 45 bolts the first end bracket 41 to the structural member 39. The bolt 45 is fastened such that it prevents any movement of the end bracket 41 in any direction. The second end bracket 43 has a slot 47 therein. A slot 47 is located on each side of the second end bracket 43 (only one is shown in FIG. 1). A mounting bolt 49 on the structural member 39 is passed through the slot 47. The bolts 49 passing through the slot 47 permit the second end bracket 43 to move in directions parallel or perpendicular to the axis of tube 26. The bolts 49 prevent the second end bracket 43 from moving in the vertical direction. Substantially near the center of the second end bracket 43 is a hole 53 through which an alignment pin 51 passes (as shown in the cutaway section of FIG. 1). The alignment pin 51, through the slot 53, prevents the second end bracket 43 from moving in the horizontal direction perpendicular to the axis of tube 26. The overall effect of the bolts 49 and the alignment pin 51 is to permit the second end bracket 43 to move only in the direction parallel to the axis of tube 26.

The means for introducing gas into each discharge tube 26 will be described with reference to FIGS. 3 through 6. FIG. 3 shows gas inlet passageways 72 through which gas may flow from the interior of support tube 40 into each gas discharge tube 26. Each rod-shaped anode 65 is surrounded by fitting 73, and each fitting 73 is attached to housing 71. Fitting 73 provides a seal preventing gas from flowing from passage 72 to the exterior of housing 71. One end of anode 65 is positioned adjacent gas inlet orifice 74 in the sidewall of ceramic bushing 101, so as to be in electrical communication with gas flowing through orifice 74 into the interior of ceramic bushing 101 (bushing 101 comprises a portion of tube 26). Electrical lines 70 connect each of anodes 65 to an appropriate electric power source.

In the preferred embodiment of the inventive system shown in FIGS. 1 and 3, each gas inlet passageway 72 supplies gas from tube 40 to tube 26 through two orifices in the sidewall of tube 26. Only one orifice for each tube 26 is shown in the FIG. 3 view of the system, but both orifices are shown in FIG. 4 (which is a variation of the gas inlet means shown in FIG. 3 to be discussed below). Anode 65', held by fitting 73', is positioned adjacent the second orifice (not shown in FIG. 3) in the same manner as anode 65 is positioned adjacent the first orifice (orifice 74 of FIG. 3). The two orifices are separated from each other by a short distance along the axis of tube 26, so that anode 65' lies below the plane of FIG. 3 (into the page) whereas anode 65 lies in the plane of FIG. 3.

FIG. 4 is a cross-sectional view, of a preferred embodiment of a gas inlet means that may be used in the inventive system, in a horizontal plane containing the longitudinal axis of tube 26. Ceramic bushing 101 is fitted around the end portions of sections 26a and 26c of tube 26, so that ceramic bushing 101 comprises section 26b of tube 26. Housing 102 surrounds the middle section of bushing 101, and includes gas inlet passages 106 and 108. O-ring seals 104 prevent gas from escaping outside housing 102 from within housing 102. Gas may flow from passage 106, past orifice 118 in the sidewall 122 of ceramic bushing 101, into interior 107 of ceramic bushing 101. Similarly, gas may flow from passage 108, past orifice 120 in sidewall 122 of ceramic bushing 101 into interior 107 of ceramic bushing 101. Gas inlet passages 106 and 108 may be portions of a common gas passageway, or may be separate passages.

Electrodes 110 and 112 are held in position by housing 102 so that their respective end portions 114 and 116 are disposed adjacent orifices 118 and 120, respectively. Electrodes 110 and 112 are thus in electrical communication with gas flowing through the orifices into tube 26. Each electrode is held by fitting 130 (which is preferably of the Cajon Ultratorr type), which fitting is attached to housing 102. Fittings 130 prevent gas from escaping from passages 106 and 108 to the exterior of housing 102.

Pressurized gas flowing past orifice 118 (and 120) will initially flow against the portion of sidewall 122 opposite the orifice, and will then flow in an eddy current such as that defined by arrows 200 (and 201), before flowing away from the orifice (and from the adjacent orifice) in the directions of arrows 202 (and 203).

It is desirable that the gas flowing in tube 26 downstream from the orifice pair have a flat velocity profile (i.e., a graph of the gas flow velocity, versus the radial distance away from the sidewall of tube 26, should approximate a straight line with zero slope). We have recognized that the relative orientation of the gas jets emerging from the pair of adjacent orifices has a dramatic effect on the gas velocity profile downstream from the vicinity of the orifice pair.

For example, if the orifices are located on the same side of sidewall 122 (so that the gas jets entering tube 26 therethrough have parallel orientation), the gas velocity profile is much less flat (i.e., spans a much greater range of velocities) than if the orifices are located on opposite sides of sidewall 122 (as shown in FIG. 4) so that the two orifices are separated by an azimuthal angle substantially equal to 180° (so that gas jets entering interior 107 of tube 26 have antiparallel orientation). If the orifices are separated by an azimuthal angle of 90° (or 135°) with respect to tube 26's longitudinal axis, then the resulting gas velocity profile will be flatter than if the azimuthal angle were 0° but will generally not be as flat as in the case that the azimuthal angle is 180°.

It is within the scope of the invention to include only a single orifice in the sidewall of tube 26 (with an electrode positioned with an end adjacent the orifice as described herein). However, in the preferred embodiment including two orifice-electrode pairs, it is preferable that the orifices be located with relative azimuthal separation substantially equal to 180° as shown in FIG. 4.

In both the embodiment including one orifice and the embodiment including two orifices, we have found that the end of each electrode should be positioned away from the center of the orifice. That is, where the longitudinal axis of the elongated electrode is positioned substantially perpendicular to the plane of the orifice (as in FIG. 4, where the axis of electrode 110 points toward the bottom of the Figure and the plane of orifice 118 is colinear with sidewall 122), the electrode's longitudinal axis should not coincide with a perpendicular line through the center of the orifice. In general, the longitudinal axis of the electrode need not be oriented perpendicular to the plane of the orifice, but the projection of the tip of the electrode on the plane of the orifice should always be spaced away from the center of the orifice. This configuration results in a much flatter gas velocity profile than in the case that the projection of the electrode tip does coincide with the orifice center.

FIGS. 5 and 6 indicate preferred dimensions and relative position of each electrode-orifice pair in the FIG. 4 system. FIG. 5 is a view of the left half of the FIG. 4 apparatus taken along line 5—5 of FIG. 4. The orifice is disc-shaped and has diameter substantially equal to half an inch (0.5"). FIG. 6 is an enlarged mirror-image view of the end portion of electrode 110 and orifice 118. Tip T of electrode 110 is offset upstream from center point C of orifice 118 by a distance in the range from about 0.08" to about 0.10".

In any of the inventive embodiments, the electrode may be either a cathode or an anode. Of course, when two electrode-orifice pairs are closely spaced as in FIG. 4, both electrodes should be of the same type (either both anodes or both cathodes). However, it is preferable that the anode of the laser resonator be positioned upstream (in the axial gas flow) with respect to the nearest cathode to enhance the light discharge resulting from application of the electric field to the flowing gas between the anode and cathode.

The foregoing is merely illustrative and explanatory of the inventive system. Various changes in the details of the embodiments described herein may be within the scope of the appended claims.

We claim:

1. A laser resonator system, including:
   a laser resonator tube having a first longitudinal axis, said laser resonator tube also having a side wall including a first orifice through which gas flows into the tube;
   a first elongated electrode, having a second longitudinal axis and a first end portion; and
   means for mounting the first electrode at the first orifice so that the fist end portion is in electrical communication with gas flowing through the first orifice into the tube, and so that the projection of the first end portion on the plane of the first orifice is spaced from the center of the first orifice.

2. The system of claim 1, wherein the first electrode is mounted so that the second longitudinal axis is substantially perpendicular to the first longitudinal axis.

3. The system of claim 1, wherein the first electrode is an anode.

4. The system of claim 1, wherein the tube also includes a second orifice through which gas flows into the tube, and also including:
   a second elongated electrode, having a third longitudinal axis and a second end portion; and
   means for mounting the second electrode at the second orifice so that the second end portion is in electrical communication with gas flowing through the second orifice into the tube, and so that the projection of the second end portion on the plane of the second orifice is spaced from the center of the second orifice.

5. The system of claim 4, wherein the first orifice and the second orifice are separated by an azimuthal angle substantially equal to 180° with respect to the first longitudinal axis.

6. The system of claim 4, wherein the second electrode is mounted so the third longitudinal axis is substantially perpendicular to the first longitudinal axis.

7. The system of claim 6, wherein the first end portion and the second end portion are mounted so as to point in substantially anti-parallel directions.

8. The system of claim 4, wherein each electrode is an anode.

9. A laser resonator system, including:
   a laser resonator tube having a first longitudinal axis, said laser resonator tube also having a side wall including a first orifice through which gas flows into the tube;
   a housing including a gas supply passage through which gas flows, said housing being attached to the tube so that gas flows from the gas supply passage through the first orifice into the tube; and
   a first elongated electrode, having a second longitudinal axis, a first portion attached to the housing, and a second end portion, said second end portion extending into the gas supply passage adjacent the first orifice in such a position that said second end portion is in electrical communication with gas flowing through the first orifice into the tube, and in such a position that the projection of the second end portion on the plane of the first orifice is spaced from the center of the first orifice.

10. The system of claim 9 wherein the first electrode is attached to the housing so that the second longitudinal axis is substantially perpendicular to the first longitudinal axis.

11. The system of claim 9, wherein the tube also includes a second orifice through which gas flows into the tube, wherein the housing includes a second gas supply passage through which gas flows, and wherein said housing is attached to the tube so that gas flows from the second gas supply passage through the second orifice into the tube, and also including:

A second elongated electrode having a third longitudinal axis, a first portion attached to the housing, and a second end portion positioned in the second gas supply passage adjacent the second orifice so that said second end portion is in electrical communication with gas flowing through the second orifice into the tube, and so that the projection of the second end portion on the plane of the second orifice is spaced from the center of the second orifice.

12. The system of claim 11, wherein the first orifice and the second orifice are separated by an azimuthal angle substantially equal to 180° with respect to the first longitudinal axis.

13. The system of claim 11, wherein the second electrode is attached to the housing in such a manner that the third longitudinal axis is substantially perpendicular to the first longitudinal axis.

14. The system of claim 13, wherein the second end portion of the first electrode and the second end portion of the second electrode are attached to the housing so as to point in substantially anti-parallel directions.

15. The system of claim 11, wherein each electrode is an anode.

16. An axial flow gas laser system, including:
a support tube through which gas flows;
a laser resonator tube having a first longitudinal axis, said laser resonator tube also having a side wall including a first orifice, said laser resonator tube being connected to the support tube at said first orifice so that gas flows from the support tube through the first orifice into the resonator tube;
a first elongated electrode, having a second longitudinal axis and a first end portion; and
means for mounting the first electrode at the first office so that the first end portion is in electrical communication with gas flowing through the first orifice into the resonator tube, and so that the projection of the first end portion on the plane of the first orifice is spaced from the center of the first orifice.

17. The system of claim 16, also including:
an exhaust tube; and
a branch tube connected between the resonator tube and the exhaust tube at a position downstream from the first orifice, so that the gas entering the resonator tube at the first orifice initially flows along the resonator tube, and then flows through the branch tube into the exhaust tube.

18. The system of claim 17, also including:
a second electrode attached to the resonator tube between the first orifice and the branch tube in such a position that the second electrode is in electrical communication with gas flowing within the resonator tube.

19. The system of claim 18, wherein the first electrode is an anode and the second electrode is a cathode.

* * * * *